(12) United States Patent
Zagar et al.

(10) Patent No.: US 7,547,169 B1
(45) Date of Patent: Jun. 16, 2009

(54) DRILLING MODULE WITH AUTOMATIC TOOL CHANGER

(75) Inventors: John F. Zagar, Mentor, OH (US); William K. Schimke, South Euclid, OH (US)

(73) Assignee: Zagar Inc., Cleveland, OH (US)

( * ) Notice: Subject to any disclaimer, the term of this patent is extended or adjusted under 35 U.S.C. 154(b) by 0 days.

(21) Appl. No.: 12/171,355

(22) Filed: Jul. 11, 2008

(51) Int. Cl.
*B23C 5/26* (2006.01)

(52) U.S. Cl. .................. 409/233; 409/231; 409/218; 409/185; 408/137; 33/639

(58) Field of Classification Search ................ 409/231, 409/232, 233, 185, 218; 408/239 R, 239 A, 408/124, 129, 137; 33/626, 636, 639
See application file for complete search history.

(56) References Cited

U.S. PATENT DOCUMENTS

| | | | | |
|---|---|---|---|---|
| 4,167,218 A | * | 9/1979 | Horiuchi et al. | 409/233 |
| 5,100,271 A | * | 3/1992 | Kameyama et al. | 409/231 |
| 5,350,263 A | * | 9/1994 | Fedeli | 409/231 |
| 5,735,651 A | * | 4/1998 | Harroun | 409/233 |
| 5,888,033 A | * | 3/1999 | Zagar et al. | 408/14 |
| 7,367,097 B2 | * | 5/2008 | Nakamura et al. | 409/223 |
| 7,367,762 B2 | * | 5/2008 | Takase et al. | 409/233 |

OTHER PUBLICATIONS

Various catalog pages from Kennametal catalogs, specifically pp. 774, 775, 780, 781 S150 (2 pages).

* cited by examiner

*Primary Examiner*—Erica E Cadugan
(74) *Attorney, Agent, or Firm*—Pearne & Gordon LLP

(57) ABSTRACT

A machining unit comprising a quill carrying a spindle, a tool clamping mechanism on a forward end of the spindle, a drive shaft for rotatably driving the spindle through the quill, a tool feed actuator for extending and retracting the quill to and from a home position in both axial directions, the clamping mechanism being arranged to grip a tool holder when the quill is at or forward of the home position and to release or accept a tool holder when it is rearward of the home position.

15 Claims, 3 Drawing Sheets

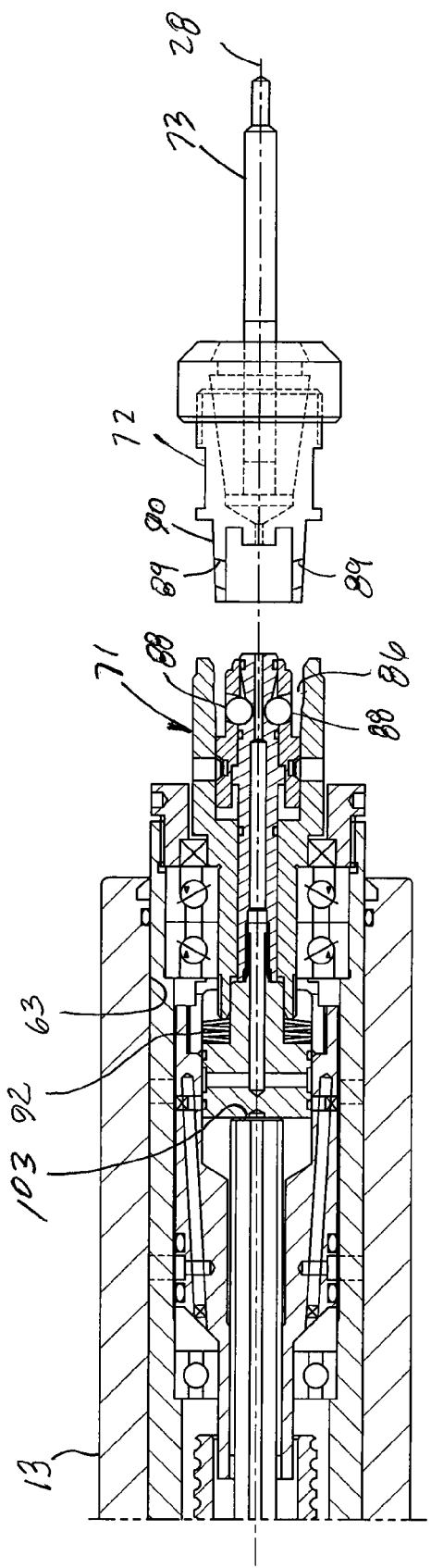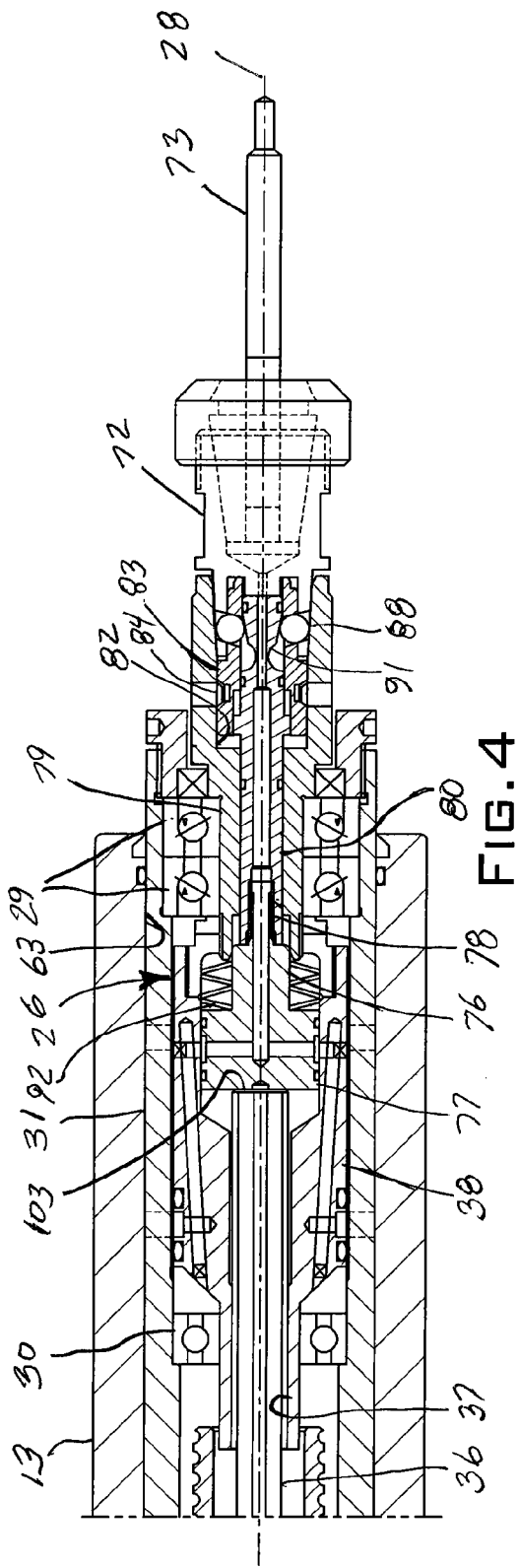

DRILLING MODULE WITH AUTOMATIC TOOL CHANGER

The invention relates to automatic tool changing apparatus for a self-contained drilling unit.

BACKGROUND OF THE INVENTION

Automation of machining and like operations frequently involves use of gantry machines, robots, and like positioning apparatus fitted with sophisticated drilling and other rotary tool equipment. These positioning apparatus that can be fitted with self-contained machining units to perform certain tasks such as drilling, counter-sinking, tapping, facing, reaming, grooving, and similar operations. Frequently, there is a need to change the tool being used by the machining unit as it progressively machines a workpiece. For example, drills of different diameters or other geometries are often required to produce the desired features on a workpiece.

It is desirable to perform tool changing automatically with commands which can be conveniently programmed into the machine controller operating the robot or other positioning apparatus. However, the instrumentalities needed to effectuate reliable automatic tool gripping and releasing action may not be readily adoptable or even apparent. Further, it is important that any tool changing feature not unnecessarily add, for example, to the cost, complexity, bulk, and mass of the system.

SUMMARY OF THE INVENTION

The invention provides an automatic tool changing feature on a self-contained machining unit. Specifically, the invention utilizes the linear actuator, conventionally serving to feed or retract a spindle mounted drill or other rotary tool, as an actuator for clamping and unclamping the tool. Since this linear actuator and its attendant controls are already present with the machining unit, there is essentially no monetary cost or inertia penalties attributable to the automatic mechanical actuation of the tool clamp mechanism carried on the spindle.

In the illustrated embodiment, the tool clamping mechanism is of a generally known spring applied, axial force released style. The clamping mechanism, carried on the output end of the spindle, is released when the spindle is retracted rearward of its normal home position. Conversely, the clamping mechanism is caused to lock onto a tool or tool holder by operation of an internal spring when the spindle is initially advanced from this rearwardmost position. As disclosed, the spindle can be extended and retracted by a ball screw integrated with the spindle. The screw is coaxial with the spindle axis and is arranged to press the spindle driveshaft against a release face of a clamping bar assembly on the axis of the spindle. The coaxial arrangement of the screw and tool clamping mechanism eliminates the need for complicated kinematics to convert motion from one direction to another and/or from one amplitude to another.

BRIEF DESCRIPTION OF THE DRAWINGS

FIG. 3 is a cross-sectional view of the tool holding end of the machining unit showing a spindle mounted clamping mechanism in an open tool holder receiving or releasing position and an aligned but uninstalled tool holder and tool; and FIG. 4 is a view similar to FIG. 3, with the tool holder and tool clamped in the clamping mechanism.

DESCRIPTION OF THE PREFERRED EMBODIMENT

Figure 1:
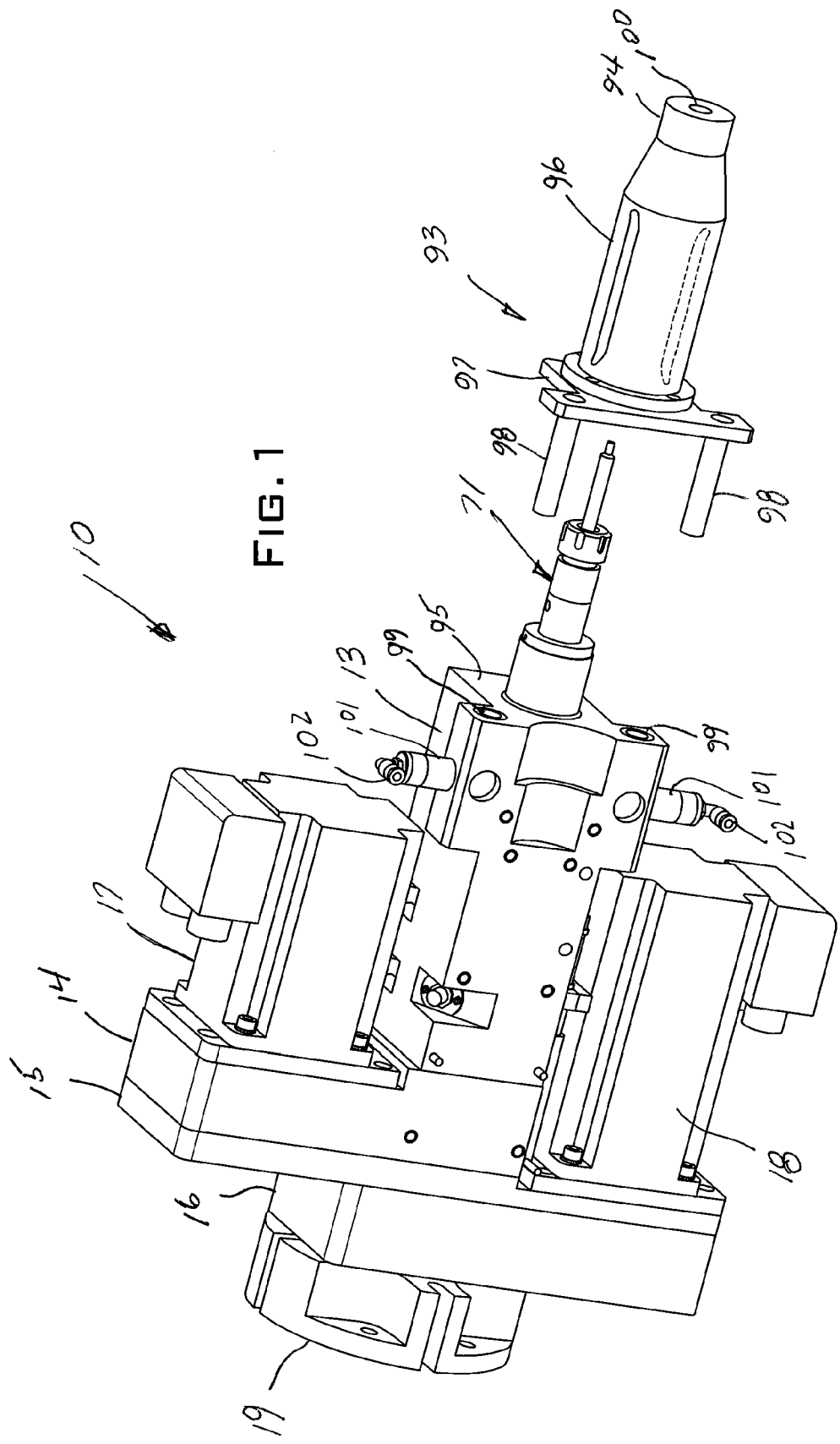
FIG. 1 is a somewhat schematic isometric view of a machining unit constructed in accordance with the invention showing an optional alignment fixture.

There is shown in the drawings a machining unit or module 10 for drilling, counter-sinking, tapping, facing, reaming, grooving, and like machining operations. The unit 10 is self-contained in the sense that it carries its own motors 17, 18, respectively, for feeding and rotating a tool. The unit 10 can be mounted on a gantry, robot, or other machine enabling it to be carried and positioned over a specific area of a workpiece.

The machining unit 10, in the illustrated embodiment, comprises a main housing 13, a first auxiliary housing 14, an intermediate plate 15, and a second auxiliary housing 16. The first auxiliary housing 14 serves to carry the feed motor 17 and encloses a drive train powered by this motor. The plate 15 carries the spindle motor 18 and the second auxiliary housing 16 encloses a drive train powered by this motor. Bolted to the rear of the second auxiliary housing 16 is an exemplary adaptor or mounting bracket 19 suitable for mounting the unit 10 on an automatic or numerically controlled positioning device such as a robot or gantry. The position and orientation of the adaptor 19 or its equivalent on the housings 13, 14, 16 or plate 15 can be changed for a particular application.

Figure 2:
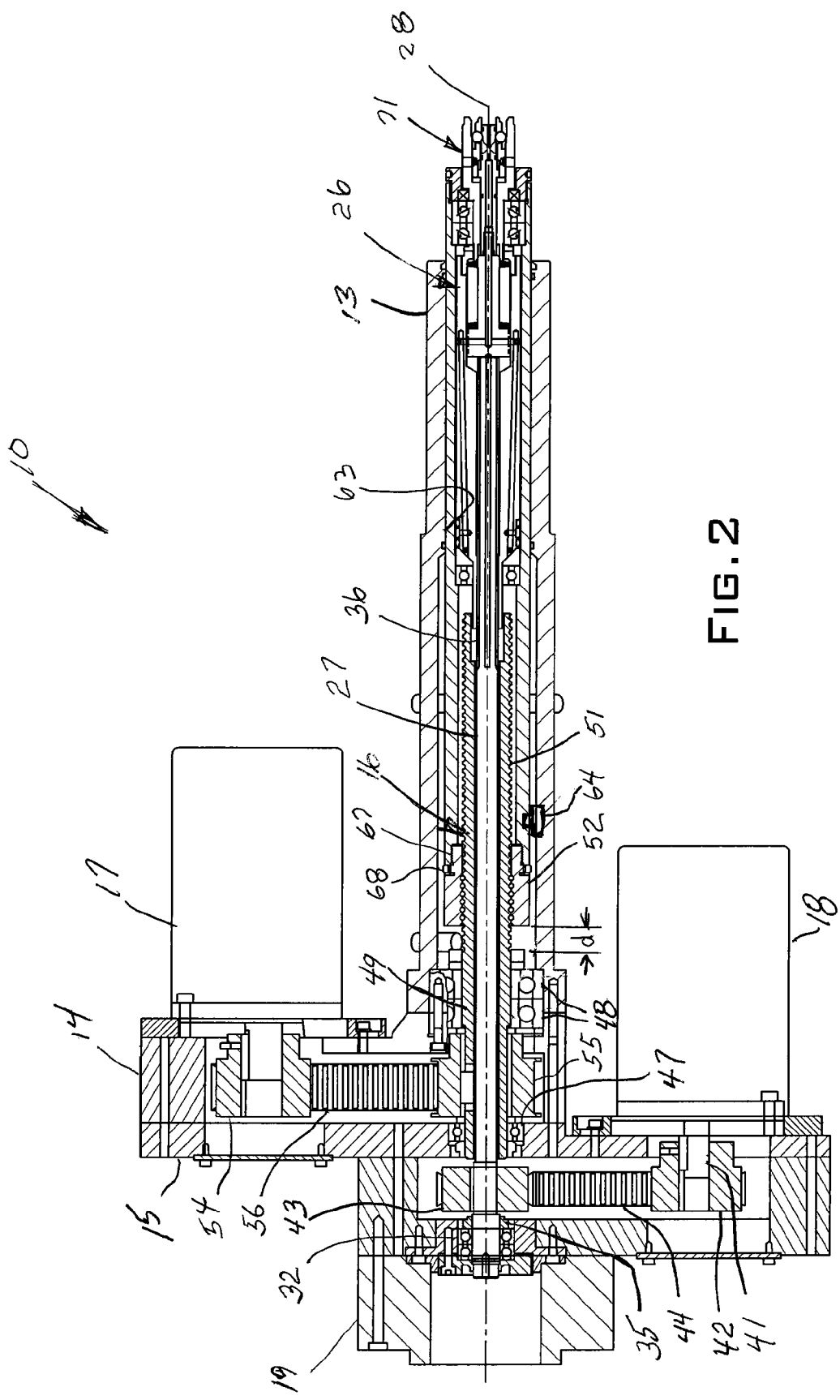
FIG. 2 is a cross-sectional view of the machining unit taken in a plane along the rotational axis of its spindle.

With reference to FIG. 2, the housing 13 carries a longitudinally extending spindle assembly 26 at its forward end and a spindle drive shaft 27 to the rear, both rotatably supported in bearings for rotation about a common axis 28. The spindle assembly 26 is supported by bearings 29, 30 mounted in a quill or hollow shaft 31 also concentric with the axis 28. A rearward end of the driveshaft 27 is rotationally supported in a bearing 32 mounted in the second auxiliary housing 16 while its forward end is received in the spindle assembly 26. A nut 35 threaded on the driveshaft 27 abuts an inboard one of the bearings 32 to axially support the driveshaft against rearward forces. The forward end of the driveshaft 27 has an external involute spline 36 received in a mating internal spline 37 in a spindle body 38. This arrangement enables the spindle body 38 to radially support this forward splined end of the driveshaft while enabling the drive shaft to rotate the spindle assembly 26. The spindle drive shaft 27 is rotationally driven by the electric motor 18, which preferably is speed controllable and reversible. A shaft 41 of the motor 18 drives a toothed pulley 42 which in turn drives a similar pulley 43 on the spindle drive shaft 27 through a toothed belt 44.

A hollow ball screw assembly 46 in the main and first auxiliary housings 13, 14 is concentrically disposed about the spindle drive shaft 27. The ball screw assembly 46 is rotationally supported in bearings 47, 48 in the intermediate plate 15 and the main housing 13, respectively. The ball screw assembly 46 includes a tubular main body 49 with an external helical screw portion 51 and a nut 52 assembled on the screw portion. In a known manner, recirculating balls under a preload enable the nut 52 to operate along the screw portion 51 without backlash. The ball screw assembly main body 49 is rotationally driven by the feed motor 17 which, preferably, is speed controllable and reversible through a drive train comprising toothed pulleys 54, 55 and a toothed belt 56. The ball nut 52 is coupled to a rear end of the quill 31. The quill 31 has a precision sliding fit in a bore 63 in the main housing 13. A cam roller (schematically shown at 64 in FIG. 2) extending radially from the wall of the quill 31 rides in a longitudinally extending slot in the main housing to prevent rotation of the quill.

The ball nut 52 is fixed to the quill 31 with a threaded joint 67 and set screws 68. Rotation of the ball screw body 49 in either direction produces a corresponding axial displacement of the nut 52 and quill 31.

The spindle assembly 26 includes at its forward end a clamping mechanism 71 for releasably supporting a tool holder 72 (FIGS. 3 and 4). In the normal circumstance, a tool 73 is replaceably fixed on the tool holder 72 but it will be understood that the tool may be a permanent part of the holder. That is to say, the clamping mechanism 71 can be used to hold a tool directly rather than through the medium of a tool holder. The clamping mechanism 71 is an adaptation of commercially available units such as those marketed by Kennametal, Inc. The clamping mechanism 71, at its rear, includes a cylindrical shank 76 with a cylindrical head 77. An externally threaded reduced diameter extension 78 of the shank 76 is threaded into a central actuating or clamping rod 80. A hollow circular sleeve 79 of the clamping mechanism 71 is axially and radially supported in the precision bearings 29 seated in the forward end of the quill 31. The forward end of the sleeve 79 has a large axially oriented counterbore 82 concentric with the spindle axis 28. A circular bushing 83 is securely fixed in the counterbore 82 by set screws 84. The outside diameter of the bushing 83 and inside diameter of the sleeve counterbore 82 at their respective outer ends define between them an annular pocket 86. The bushing 83 has two diametrically opposite holes in its wall that receive steel balls 88. The balls 88 in radially outward positions enter holes 89 in a hollow tapered shank 90 of the tool holder 72 to tightly retain the shank in the annular pocket 86. The clamp rod 80 has diametrally opposed external grooves 91 at its forward end. When the clamp rod 80 is extended forwardly relative to the sleeve 79 and bushing 83, the balls 88 can retract radially to accept or release the shank 90 from the position illustrated in FIG. 4. Normally, a compression spring 92 in the form of a pack of spring discs disposed between the shank head 77 and sleeve 79 holds the clamp rod 80 in the position illustrated in FIG. 4 where the balls 88 are in radially outward positions projecting well beyond the local outer surface of the bushing 83. The tool holder 72 is shown with an exemplary tool such as a step drill, it being understood that other tools can be mounted on the tool holder or integrated with the equivalent of the tool holder shank 90.

With reference to FIG. 1, a fixture 93 can be used to precisely align the unit 10 to a master fixture indexed with a workpiece or directly to a workpiece. The fixture 93 includes an alignment device, in the illustrated case a bushing 94 at its lead end that can couple with a complementary shaped receiver fixed relative to a workpiece. The bushing 94 has a through bore 100 normally substantially smaller than the maximum diameter of the tool holder 72. A rigid extension 96 is formed by a hollow cylinder with a conical transition at its lead end. An adaptor plate 97 is fixed to the rear of the extension 96 and a pair of parallel rods 98 extend off the rear of the plate in the longitudinal direction, i.e. parallel to the axis of the extension 96. The main housing 13 has a pair of parallel longitudinally extending bores 99 in its forward end parallel to the spindle axis 28. The bores 99 are proportioned to receive the rods or pins 98 with a close sliding fit and thereby accurately align the fixture 93 to the machining unit 10 with the adaptor plate 97 abutting an end face 95 of the housing 13. A rod clamp 101 is associated with each of the bores 99. Each clamp 101 is operative to clamp a respective one of the rods 98 with a spring developed force to thereby hold the alignment fixture 93 in place on the unit 10 with the adaptor plate 97 abutting an end face 95 of the housing 13. Air pressure introduced to the clamps 101 through fittings 102 is effective to overcome the spring force and release the rods 98.

Air passages in the spindle assembly can be used to purge the clamp mechanism 71 of any debris or dirt when a tool change is made and if a continuous supply of pressurized air is maintained in the passages, a drop in pressure can be used to detect a fault in the tool clamping process.

The machining unit 10 is especially useful in applications where the work requires machining with different tools because, for example, different tool shapes are necessary and/or because a high rate of tool wear is unavoidable. In a typical mode of use, the robot, gantry or other automatic positioning device on which the unit 10 is mounted can position the spindle mounted tool clamping mechanism 71 over the shank end of a selected tool holder or tool. A set of different tools can be stored in an array defined by a tool port with the shanks individually accessible to the spindle clamping mechanism 71. The unit 10, in accordance with the invention, utilizes the tool feed componentry, i.e. the feed motor 17, drive train elements, and ball screw assembly 46 to selectively operate the spindle clamping mechanism 71. FIG. 2 illustrates the ball screw assembly 46 in a home position where the tool 73 is in its rearwardmost operating position. To release the spindle clamping mechanism 71, the spindle motor 18 is energized in a quill retracting direction. Close inspection of FIG. 2 reveals that the ball nut 52 can retract a distance "d" from its home position. The corresponding motion of the quill 31 initially causes the head 77 of the clamp shank 76 to engage the end face, designated 103 (if it is not already engaged) of the drive shaft 27. No further motion of the clamp shank 76 can occur when the quill 31 carrying the clamping mechanism 71 continues in the reverse direction, decreasing the distance "d" to near zero. At this time, it will be understood that the spindle driveshaft 27 in arresting movement of the clamp shank 76 relative to the clamp sleeve 79 and bushing 83 has compressed the spring 92 and enabled the grooves 91 in the clamp rod 80 to receive their respective balls 88 sufficiently to permit the hollow shank 90 of the tool holder 72 to be received in or be released from the clamp pocket 86. Assuming that a shank 90 has been received in the pocket 86, the feed motor 17 can be operated in the feed direction thereby moving the ball nut 52 on the screw 51 to restore the distance "d" to that illustrated in FIG. 2. In this position and upon further feed motion of the ball screw assembly 46, the spring 92 will securely hold the clamp rod 80 in position relative to the bushing 83 thereby maintaining the tool shank 90, clamped on the spindle assembly 26 by radial extension of the balls 88 resulting from a cam action produced by axial movement of the grooves 91 within the bushing 83. Once the tool shank 90 is clamped, the robot or other positioning device is operated to convey the unit 10 to a workstation where the unit can be put to work. The procedure to exchange one of the tool holders for another will be understood from the foregoing explanation. The robot or other positioning device can be programmed to deposit one tool in the port and move to another position in the port to pick up a tool holder for a subsequent operation.

Where the unit 10 is equipped with the alignment fixture 93, it is necessary to program the robot to locate the unit at a temporary storage site for the alignment fixture and temporarily park the fixture at this station while tools are being automatically exchanged at the tool port. The fixture 93 is simply released from the unit 10 by supplying air pressure to the clamps 101 and is locked in position on the unit by exhausting pressure to these clamps.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A machining unit comprising a quill carrying a spindle, a tool clamping mechanism on a forward end of the spindle, a drive shaft for rotatably driving the spindle about an axis through the quill, a tool feed actuator for extending and retracting the quill to and from a home position in both axial directions, the clamping mechanism being arranged to grip a tool holder when the quill is at or forward of the home position and to release or accept a tool holder when it is rearward of the home position via the provision of an axial force provided to the clamping mechanism by the drive shaft.

2. A machining unit as set forth in claim 1, wherein when said clamping mechanism is arranged to accept or release a tool holder, said clamping mechanism is opened.

3. A machining unit as set forth in claim 2, wherein said drive shaft is arranged to provide said axial force by resisting movement of a portion of said clamping mechanism when said quill moves rearwardly from said home position.

4. A machining unit as set forth in claim 1, including a demountable fixture adapted to be releasably clamped on said unit and having an alignment element forward of said tool holder clamped in said clamping mechanism and concentric with the rotational axis of the spindle.

5. A machining unit as set forth in claim 4, wherein said fixture includes a rigid extension extending longitudinally between said alignment element and a portion of said unit rearward of said clamping mechanism and laterally of said clamping mechanism.

6. A machining unit as set forth in claim 1, wherein said clamping mechanism applies a clamping force on the tool holder by a spring contained in said quill.

7. A machining unit for use with a robot or gantry or other positioning apparatus said machining unit comprising
a housing,
a quill mounted in the housing for movement along an axis in forward and reverse directions,
a spindle assembly mounted in the quill for rotation about said axis, the spindle assembly having an outer end arranged to project forward from the quill and an inner end within the quill,
a spindle assembly drive shaft in a telescoped coupled relation with the spindle assembly for driving the spindle assembly in rotation about said axis while the quill forcibly moves the spindle assembly along said axis,
a linear actuator for driving the quill in the forward and reverse directions between fully extended and fully retracted positions,
a rotary actuator for rotating the drive shaft,
a tool clamping mechanism on the outer end of the spindle assembly, the tool clamping mechanism being normally biased to a clamping position by a compression spring, and assuming a tool releasing position when an axial force is directed on the tool clamping mechanism in a forward direction, a stop surface on the spindle assembly drive shaft in the quill disposed in the path of the tool clamping mechanism adjacent the fully retracted position of the quill, the stop surface being arranged to apply the axial force on the tool clamping mechanism to cause the tool clamping mechanism to assume its tool release position.

8. A machining unit as set forth in claim 7, wherein the force at the tool stop surface on the tool clamping mechanism is developed by retraction of the quill to the retracted position by operation of the linear actuator.

9. A machining unit as set forth in claim 8, wherein the linear actuator is a ball screw assembly on the housing concentrically arranged about said axis of rotation of the spindle assembly.

10. A machining unit as set forth in claim 9, wherein said stop surface is axially fixed relative to said drive shaft.

11. A machining unit as set forth in claim 10, wherein said stop surface is formed by a forward end of the drive shaft.

12. A machining unit as set forth in claim 7, including an alignment bushing fixed on said housing axially forward of said tool clamping mechanism.

13. A machining unit as set forth in claim 12, wherein said alignment bushing has a central through bore smaller than the size of a tool holder for which said tool clamping mechanism has capacity, said alignment bushing being disposed on a fixture adapted to be automatically mounted on and dismounted from said housing.

14. A machining unit as set forth in claim 13, including a releasable lock to automatically fix said alignment bushing on said housing.

15. A machine for rotating and axially moving a tool including a frame, an automatic tool clamp for clamping a tool or tool holder, a power drive on the frame for rotating the tool clamp about an axis, and a power actuator for moving the tool clamp forward or rearward along the axis relative to the frame, the tool clamp being arranged to be operated to open by rearward movement produced by the power actuator of the tool clamp against a stop on the power drive and stationary with respect to the frame along the axis and to close when the tool clamp is moved away from said stop by said power actuator.

* * * * *